United States Patent [19]
Bertheas

[11] 3,745,956
[45] July 17, 1973

[54] SELF-GUIDANCE METHODS AND DEVICES FOR ANTI-SUBMARINE MISSILES
[75] Inventor: Jean Bertheas, Paris, France
[73] Assignee: Thomson-CSF, Paris, France
[22] Filed: May 11, 1971
[21] Appl. No.: 142,310

[30] Foreign Application Priority Data
May 29, 1970 France ................................ 7019737
Oct. 13, 1970 France ................................ 7036928

[52] U.S. Cl. ........................ 114/23, 244/3.15, 102/7
[51] Int. Cl. ........................ F42b 21/20, F42b 19/00
[58] Field of Search ............................ 102/7, 54, 3; 114/23, 21 R, 21 A; 244/3.15, 3.21

[56] References Cited
UNITED STATES PATENTS
3,648,636   3/1972   Mentcher ............................ 102/7 X
2,599,579   6/1952   Park et al. ............................ 102/7
3,072,365   1/1963   Linscott et al. ...................... 102/3 X
3,238,910   3/1966   Steinberg ............................ 114/23

Primary Examiner—Benjamin A. Borchelt
Assistant Examiner—James M. Hanley
Attorney—Edwin E. Greigg

[57] ABSTRACT

An anti-submarine self-guided missile having no self-propulsion system. Guidance is effected by controlling the position of vanes through the use of proportional navigation techniques and a passive listening post. Command signals proportional to the components of the angular rate of rotation of the missile defined at each instant by the position of the missile and of the target and measured relative to an absolute axis are applied to the control elements for controlling the position of the vanes.

31 Claims, 15 Drawing Figures

PATENTED JUL 17 1973 3,745,956

Inventor
Jean Bertheas
by
Edwin E. Greigg

SELF-GUIDANCE METHODS AND DEVICES FOR ANTI-SUBMARINE MISSILES

BACKGROUND OF THE INVENTION

1. Field of the Invention

The present invention relates to self-guidance of destructive missiles used in anti-submarine warfare, and self-guidance systems and vehicle used in connection therewith.

The invention is generally related to weapons carried on vessels or by helicopters or aeroplanes and designed for destruction of adversary submarines towards which they are launched along an air and an underwater trajectory by a missile or rocket launching device.

More particularly, the invention relates to missiles having no propulsion systems of their own of the anti-submarine type. In the following text, the term "rocket" is used in a broad sense to refer to a destructive missile of the type launched along a trajectory which may cover different mediums such as, for example, air and water, and which has no self-propelling power plant.

2. Description of the Prior Art

In the known warfare methods used, the aerial trajectory of an anti-submarine missile, e.g., of the rocket type, launched from a surface vessel or from a helicopter for example, should always be such that the point of impact on the water is substantially vertically above the computed future position of the submersed submarine target at which the launched missile is directed. The calculation of the future position of the target may be effected, for example, using sonar equipment on board the air or surface vessel from which the missile is launched, taking into account the duration of the aerial trajectory and the downward vertical velocity of the missile, the latter being assumed to reach its free fall velocity in water, very quickly. In this computation, the target is assumed to have a uniform rectilinear movement, not necessarily horizontal, within a known range of speeds.

The dispersion in the sonar measurements carried out in order to pinpoint the target, and the possible changes in the position of the target between the instant of sonar contact or recorded measurement and the instant of impact of the missile on the water, can result in the situation where the real future target position is not identical with the computed future target position. Consequently, the target is not disposd vertically beneath the point of impact of the missile in the water.

The majority of the current anti-submarine missiles of the rocket type carry proximity detection circuits which activate the detonator when the missile arrives in the close vicinity of the target. However, when the distance between the computed future target position represented by a point determined by a vertical dropped from the point of impact of the missile on the water and the real future target position is in excess of the radius of action of the proximity detection circuit, then it becomes necessary to correct the submarine trajectory of the missile in order to reduce this distance and thus enable the detonator to be triggered in the vicinity of the target. To this end, it is therefore necessary to provide the missile with a self-guiding device.

Only anti-submarine missiles equipped with self-propelling systems have hitherto been suitable for equipping with self-guidance devices. This is the case, for example, with torpedoes. The missile then uses its self-propelling system to follow all the maneuvers of the target. In the case of a tracking maneuver of the "dog leg" type, the missile may overtake the target and hit it from the rear. By contrast, missiles which have no self-propelling system, cannot be guided in this way. They operate on a "pure collision" principle, that is to say, they attack the target abeam. Because of the absence of any self-guidance facility, such conventional missiles can only be used to attack submarines which are at sufficiently shallow depth for the proximity detection facility to bridge the gap between computed and real future target positions, that is to say, depths of, for example, less than 100 meters.

SUMMARY OF THE INVENTION

In contrast to known anti-submarine warfare methods and devices, the present invention provides missiles which, while they have no self-propelling systems, are nevertheless self-guided and can be utilized to attack submarines at greater depths, for example, in the order of 500 meters.

In accordance with the present invention, accurate self-guidance of an anti-submarine missile towards a real future target position, employs the known technique of proportional navigation and consists in utilizing this technique, in association with a passive listening post, to supply to vanes or ailerons designed for controlling the trajectory of the missile commands proportional to the components of the angular rate of rotation of the missile defined at each instant by the real position of the missile and of the target, this velocity being measured in relation to absolute axes.

Other objects and characteristics of the invention, along with the attendant advantages, will be apparent from the following description, given by way of non-limitative example, and illustrated by the attached figures.

DESCRIPTION OF THE EMBODIMENTS

Figure 1:
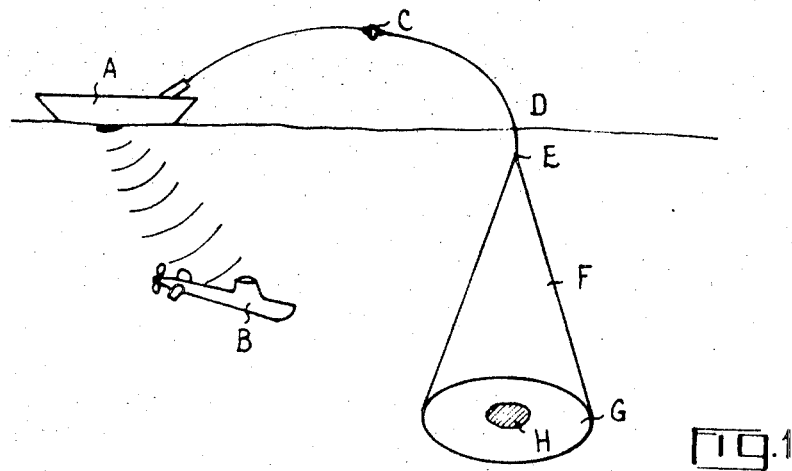
FIG. 1 is a diagram illustrating an example of the launching of an anti-submarine missile from a surface vessel.

Referring to FIG. 1, there is illustrated an example of the launching of a missile C from a surface vessel A, towards a submarine target B. The point of impact D of the missile C on the surface of the water is located vertically above the computed future position of the submarine B. During a first part DE of the submarine (path in water) trajectory of the missile C any acoustic detection is rendered impossible because of the formation of bubbles or turbulence around the missile. This period is advantageously used to trigger the electronic circuits of the self-guidance device in accordance with the invention.

The length of the trajectory DE is in the order of about 50 meters. The acoustic guidance of an improved missile C in accordance with the invention thus commences at the point E. It makes it possible to modify the submarine trajectory of the missile within a cone of revolution F about a vertical axis extending from apex E. The apex angle of this cone F, which is in the order of 40°–60°, depends upon the mechanical structure of the missile, and, for example, upon its ballasting. The base G of the cone F represents the maximum zone of action of a self-guided missile in accordance with the invention. The surface H represents the zone of action of the conventional missile, that is to say, the zone of action of the proximity detection facility which is all that such conventional missiles are equipped with.

The guidance of the missile by a proportional navigation technique, is rendered possible by means of a system of passive detection of the target, that is to say, the system which listens for noises produced by the target. This method of detection advantageously provides a gain in both weight and in simplicity in design and also a gain in economy since acoustic or passive detector elements are more economical than elements of an active system based upon the transmission and reception of ultrasonic waves. Thus, in accordance with the present invention a passive listening detection procedure is carried out, providing continuous information undisturbed by any background echoes. Noise produced by the missile itself is of course for all practical purposes out of the pictures, because of its slow speed of the missile and the absence of any self-propelling system therein.

In accordance with a major aspect of the invention, the missile is kept in continuous rotation about its axis if revolution, by means of guide vanes which are given a particular angle of incidence in the inoperative condition. This rotational movement, among other things, makes it possible to effect omnidirectional acoustic scanning in the azimuth plane, this being well suited to a passive listening function and being relatively inexpensive.

In order to modify the trajectory of the missile and guide it towards the target, its guiding vanes are controlled as a function of the angular velocity of rotation of the straight line joining missile and target. The vertical component of this velocity is given by the rate of angular rotation of the plane containing the target and the axis of rotation of the missile, while its horizontal component is given by the angular rate of rotation of the straight line joining the missile and the target, in said plane. These two components are determined respectively by means of measurements of the azimuth and elevational angles of the target, these measurements being carried out in accordance with the invention by means of the passive listening system of the missile.

Accurate angular detection in azimuth utilizes amplitude comparison, after detection, of the signals received by two predetermined acoustic which are offset from one another. These channels are narrow in the azimuth direction and wide in the elevational direction since scanning takes place exclusively in the azimuth plane. This angular detection requires an absolute azimuth reference which is furnished by means of a gyrometer associated with an integrator which cal-culates the angle through which the missile rotates between two successive passes of the acoustic axis of the passive listening system, over the target. The different between the calculated angle and 360° defines the target position displacement per revolution of the missile body, and therefore the amplitude of the commands to be supplied to the guiding vanes in order to correct the inclination of the missile-target plane.

Efficient azimuth correction is effected by carrying out cyclic control of the vanes during the rotation of the missile, each time said vanes are in the missile-target plane, that is to say, twice per revolution when two vanes are provided.

As far as the relative elevational angle measured in the missile-target plane is concerned, this angle depends both on the respective velocities of target and missile, and upon the difference between computed and real future target positions. Two phase-discriminators enable the relative difference of this elevational angle to be measured. In order for this measurement to be capable of utilization in the device which generates the proportional navigation commands, the angular rate of maneuver of the missile in relation to absolute axes is subtracted from the measured elevational guide. An accelerometer advantageously located upon the axis of rotation of the missile, enables this velocity to be measured, that is to say, the difference in trim of the latter between two measurements, and enables said value to be introduced into the calculation of the elevational target position displacement. The cyclic control of the vanes in order to correct the trajectory of the missile elevationally, in the missile-target plane, takes place when said vanes are perpendicular to said plane.

Figure 2:
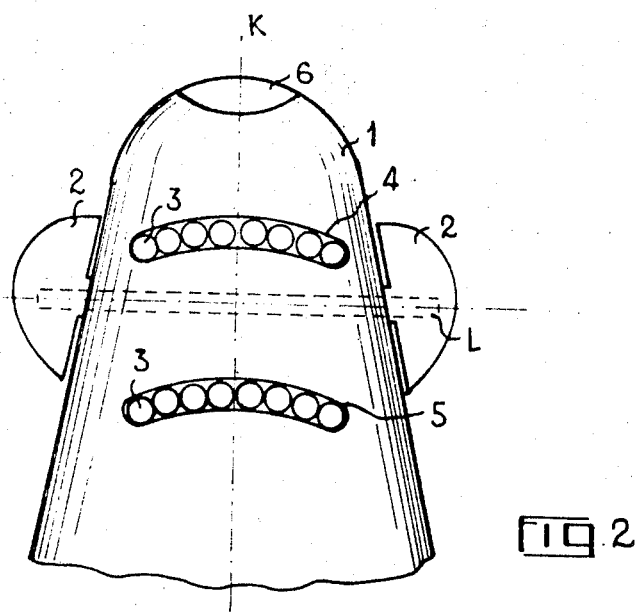
FIGS. 2, 3 and 4 are schematic frontal, profile and end views, respectively, of the forward part of an improved missile in accordance with the invention.
Figure 3:
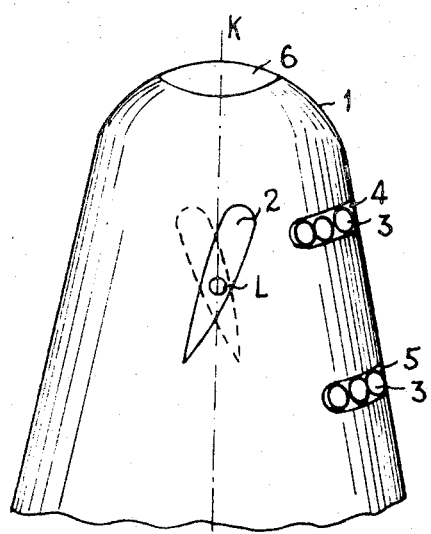
Figure 4:
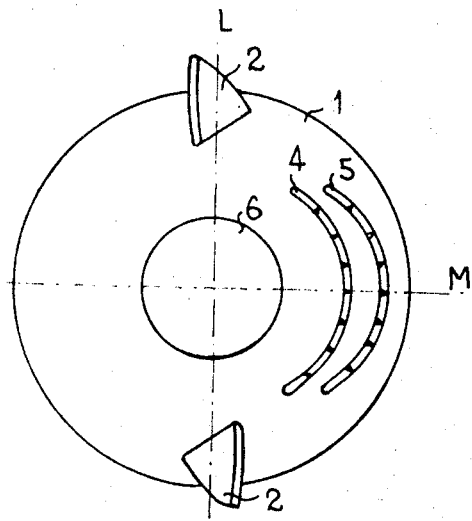

FIGS. 2, 3 and 4, respectively, illustrate a lateral view of the acoustic arrangements, a frontal view of the vanes and an end view of a missile 1. The tip of the missile 1 is occupied by an acoustic window 6 of the proximity detector fitted in said missile. As far as the acoustic guidance elements are concerned, these are composed of two similar groups 4 and 5 of hydrophones 3 located on circular arcs having a radius extending from a point, not shown, on longitudinal axis K. The hydrophones extend in a plane parallel to the axis L of the or fins 2. The distance between the phase centers of these groups, that is to say, between equivalent points of two arcs of a circle, is made greater than the wavelength $\lambda$ of the acoustic signal received in passive listening. For example, the distance may be three times the wavelength or $3\lambda$. The effect of this is to increase the sensitivity of the system's ability to determine variations in elevational angle.

The guide vanes 2 are preferably two in number and are fixed to a transverse spindle L in the missile 1. They are inclined so as to make equal angles of opposite sign with the longitudinal axis K of the missile, this imparting a screwing motion in water to the body of the missile 1. The value of this angle which is, for example, in the order of about 10°, determines the speed of rotation of the missile 1 around its own axis, taking into account its speed of descent. For example, it will be 2 revolutions per second for a speed of descent of 10 m/s.

Figure 5:
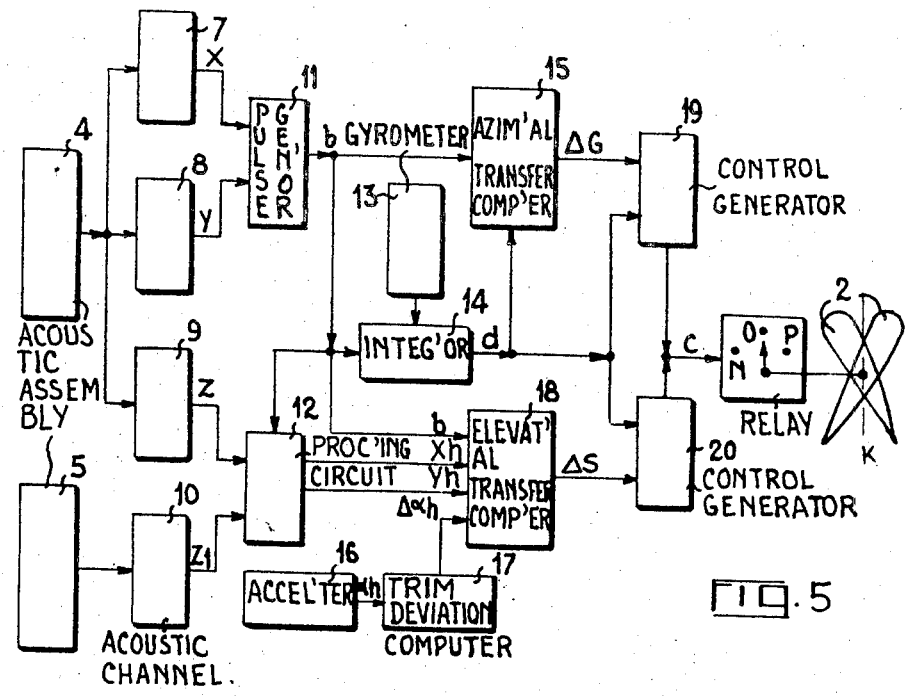
FIG. 5 is a simplified block diagram of the circuits of the self-guidance device in an improved missile in accordance with the invention.

FIG. 5 illustrates a block diagram of the electronic circuits of the self-guidance device in a missile in accordance with the invention. In this device, units 7, 8, 9 and 10 are of a similar type and form four acoustic channels X, Y, Z and $Z_1$ for received signals. The channels are narrow in the azimuth direction and wide in the elevational direction. Three of these channels 7, 8 and 9 receive the signals picked up by the acoustic assembly 4. The fourth channel 10 receives signals picked up by assembly 5.

Figure 7:
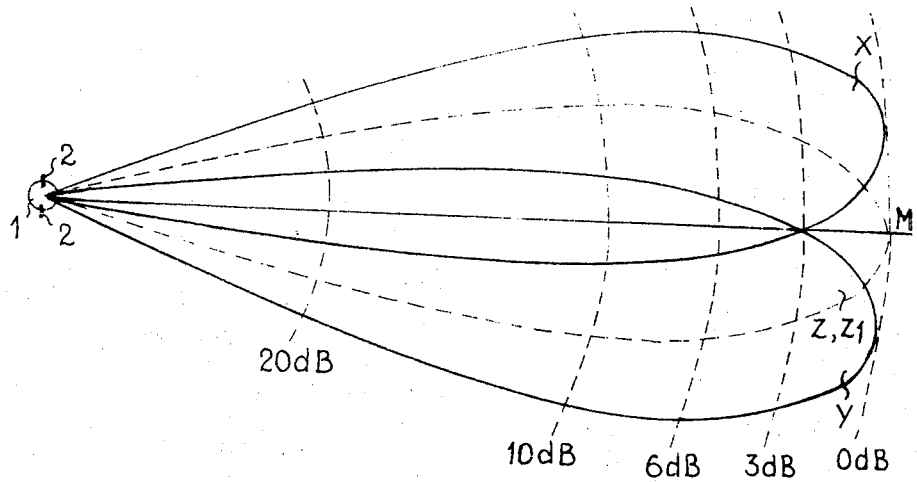
FIGS. 7 and 8 show reception directivity patterns in azimuth and elevation relative to the different "acoustic channels" provided in the system.
Figure 8:
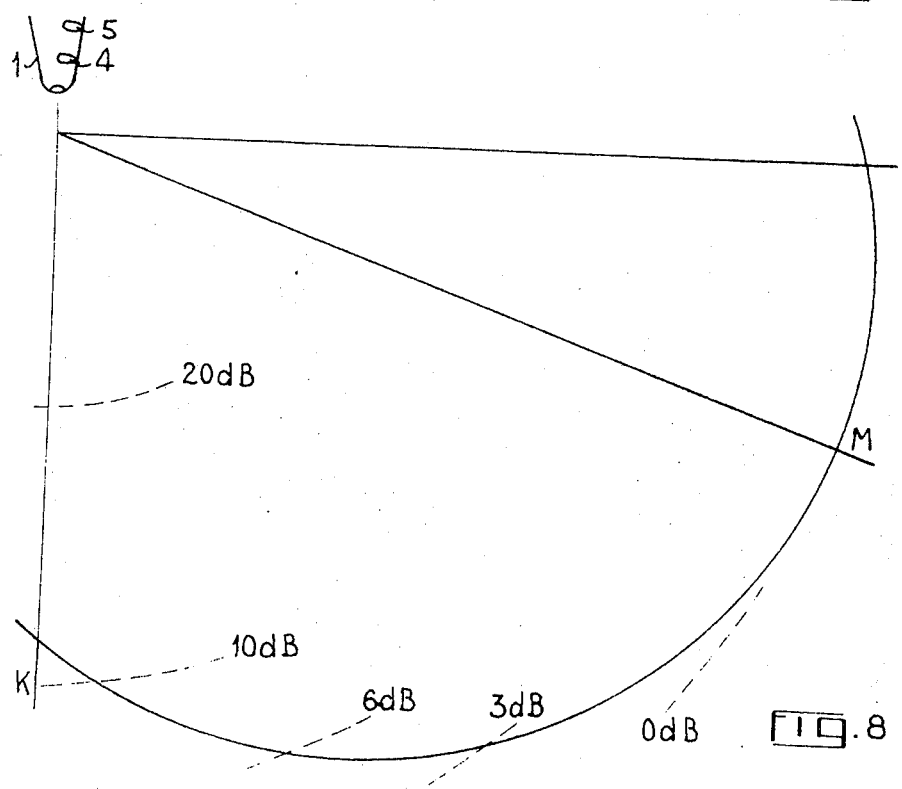

As FIGS. 7 and 8 show, in the reception directivity patterns in azimuth and elevation, the two channels X and Y are offset in relation to the acoustic axis M while the channels Z and $Z_1$ are centered on said axis. The four channels having the same elevational diagram offset in relation to the horizontal plane as a consequence of the inclination of the acoustic assemblies 4 and 5.

The signals from channels X and Y feed a pulse unit 11 which produces a pulse signal $b$ corresponding to the passage over the target of the plane defined by the axes K and M of the missile 1. This pulse signal $b$ is then supplied simultaneously to a signal processing circuit or unit 12 receiving signals from the channels Z and $Z_1$, and to a azimuth target position displacement computer unit 15 which computes the azimuth displacement. The output of the computer unit 15 is a signal represented by $\Delta G$. Unit 15 also is supplied with the signal $d$ from an integrator 14 fed by a gyrometer 13. The pulse signal $b$ is additionally supplied to said integrator 14 as well as to an elevation target position displacement computer unit 18 adapted to compute the elevational displacement, the corresponding signal of which is represented by $\Delta S$. The latter unit 18 is supplied with the signals $x_h$ and $y_h$ from the processing circuit 12, as well as with a trim-change signal $\Delta \alpha_h$ produced by an accelerometer 16 and applied through a deviation computing circuit 17. Circuits 19 and 20 are each supplied respectively with the signals $\Delta G$ and $\Delta S$ and both of them with the signal $d$ and produce an outut signal $c$ for controlling the vanes 2 of the missile 1. This control is effected by means of a three-position (N, O, P) relay 21.

Figure 6:
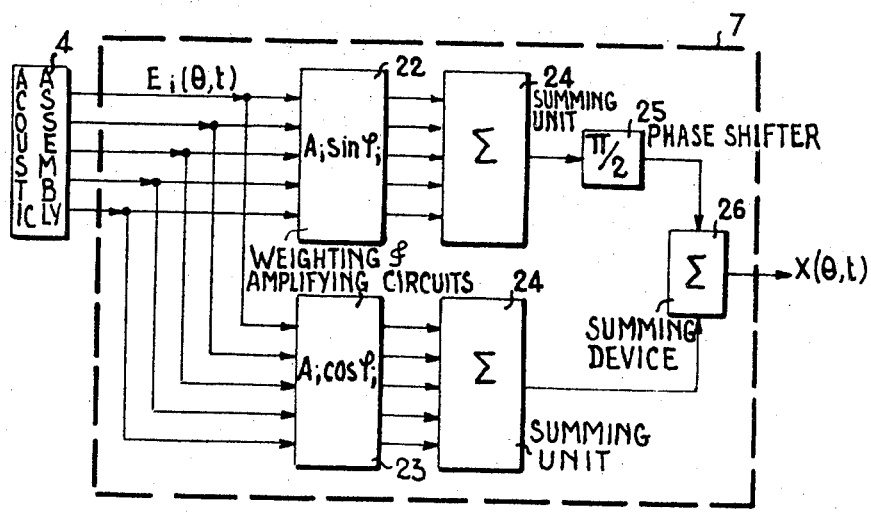
FIG. 6 is a block diagram of an "acoustic channel" unit belonging to the passive listening system of a missile in accordance with the invention.

FIG. 6 illustrates by way of example a block circuit diagram 7 of one of the four units forming acoustic channels. The directivity function $X(\theta, t)$ of such a channel is given by the relationship:

$$X(\theta, t) = \sum_{i=1}^{n} B_i(\theta, t) \cdot A_i \cdot \cos \phi_i + j \sum_{i=1}^{n} B_i(\theta, t) \cdot A_i \cdot \sin \phi_i$$

$\theta$ represents the direction of the sound souce in relation to the acoustic axis of the missile, $t$ represents the time and $i$ the number of each hydrophone, this varying from 1 to $n$. $B_i(\theta, t)$ represents the signal received by hydrophone number $i$. $A_i$ and $\phi_i$ represent amplitude and phase weighting factors respectively, which have to be introduced in order to obtain certain conditions of directivity, beam orientation and secondary lobe level. The signal $B_i(\theta, t)$ produced by the assembly 4, for example, are supplied simultaneously to two weighting networks 22 and 23 of the conventional sine-cosine type, employing resistors and operational amplifiers, each followed by summing units 24. The output of summing unit 24 is connected through a $\pi/2$ phase-shift device 25 to a summing device 26. The output of summing unit 24 is connected directly to the input of summing device 26. The output $X(\theta, t)$ of summing device 26 constitutes the output of the channel in question. The weighting factors $A_i$ and $\phi_i$ are modified in order to achieve an offset between the channels X and Y.

Figure 9:
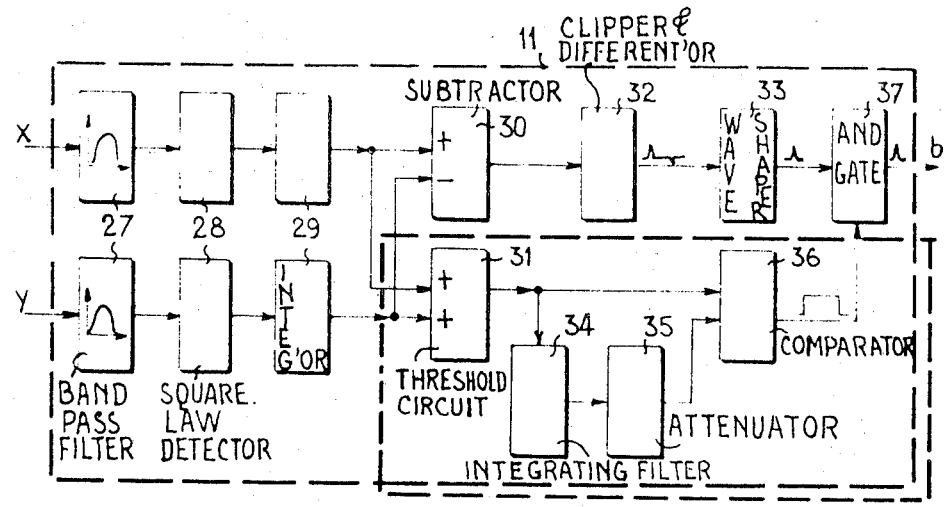
FIGS. 9, 10, 11, 12 and 13 are block diagrams of the different circuits for the units which form the self-guidance device of FIG. 5.

The crossing over the target of the plane defined by the acoustic axis M and the rotational axis K of the missile is detected when of the signals received through the channels X are of an equal amplitude and Y. This detection takes place in a pulse generator assembly 11 similar to that illustrated in FIG. 9. A first processing of the signals X and Y consists in feeding them successively into band-pass filters 27 centered on the operating frequency of the hydrophones 3, then into square-law detectors 28 and finally into integrators 29. The time constant of the integrator is chosen as a function of the speed of rotation of the missile 1 about its own axis. Fine detection of the of equality between the amplitudes of the signals X and Y is then effected by means of a subtractor 30, the output of which is fed to a clipper and differentiating circuit 32. The output of circuit 32 is, in turn, fed to a wave shaper circuit 33 for shaping and preserving for example positive pulses.

The reception patterns in azimuth of signals transmitted in channels X and Y can exhibit secondary lobes and thus every pulse which appears at the output of the circuit 33 is not always to the passage of the plane (K, M) over the target, but can also be due to the crossing of a secondary lobe over the target. In order to exclude these ambiguities, in accordance with the invention an adaptive threshold circuit 31 is provided which effects the sum of the signals X and Y after prior processing through units 27, 28 and 29. The output of circuit 31 is connected to one of the inputs of a comparator 36 and also to an integrating filter 34 which integrates over the period of one revolution of the missile. The output of this filter 34 is fed to a threshold-regulating attenuator 35, the output of which is connected to the second input of the comparator 36. Comparator 36 produces a signal corresponding to the coarse detection of the passage of the plane (K, M) over the target. This signal constitutes a kind of enabling window for AND-gate 37 to switch the pulses appearing at the output of the circuit 33. In other words, the output of comparator 36 is connected to one input of AND-gate 37 operated by the presence of an output of the comparator 36 and shaper 33. The pulses $b$ produced by AND-gate 37 thus correspond without ambiguity to a crossing over the target.

Figure 10:
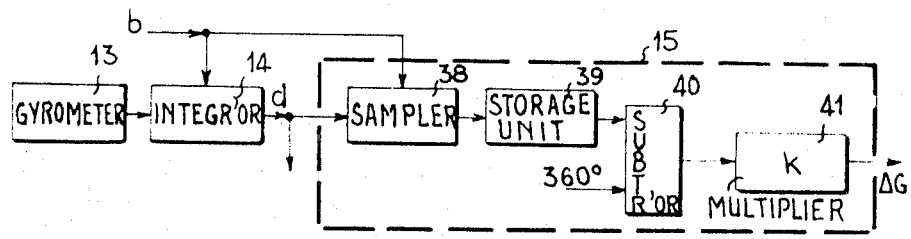

FIG. 10 illustrates a diagram of the azimuth target position displacement computer unit 15 which calculates the azimuth displacement $\Delta G$ of the plane (K,M). A gyrometer 13 associated with an integrator 14, supplies an aboslute azimuth reference $d$ to this unit 15. The integrator 14 is reset to zero by the signal $b$ coming from the unit 11, and thus determines the angle through which the missile 1 rotates between two successive crossings on the part of the plane (K,M) over the target. The value $d$, after being supplied to a sampler 38 controlled by the signal $b$, is stored in the element 39 connected to receive the output of sampler 38. It is then fed into a subtractor 40 which is also supplied with a signal corresponding to the value 360°. The output of the subtractor is fed to element 41 which multiplies the deviation thus determined, by the proportional navigation coefficient $k$, thus producing a value $\Delta G$ whose sign and amplitude define the nature of the azimuth control to be applied to the vanes 2 of the missile.

Figure 11:
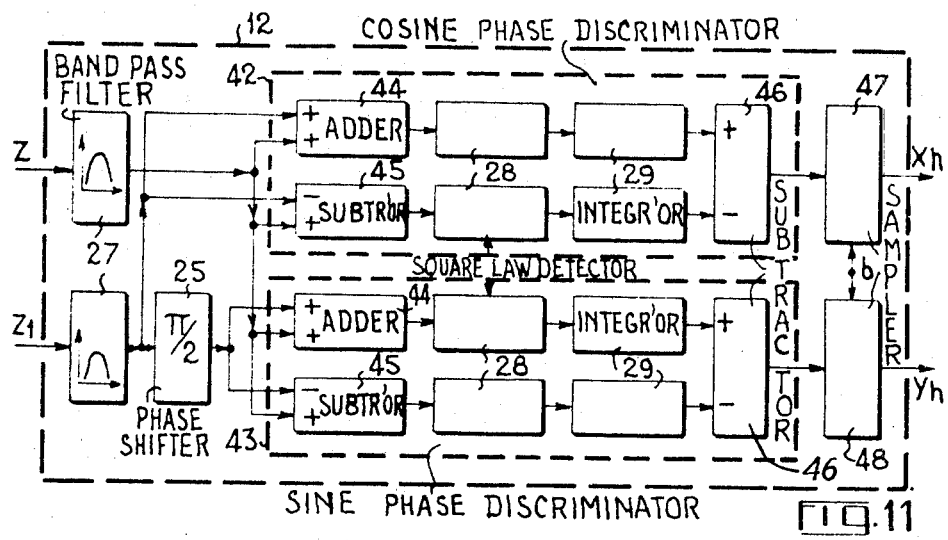

In order to calculate the elevational displacement $\Delta S$, the signals picked up in the channels Z and $Z_1$ are used. In the processing unit 12, a block circuit diagram of which is given by FIG. 11, the band-pass filters 27, identical to those of the unit 11, transmit said signals simultaneosuly to two phase discriminators. One 42 is a cosine discriminator and the other 43 is a sine discriminator. The signals of channel $Z_1$ are transmitted to the sine discriminator through the medium of a $\pi/2$ phase-shift device 25. Each discriminator is identical to the other and made up of two channels each comprising a square-law detector 28 followed by an integrator 29. These two elements are identical to those of the unit 11. The outputs of the two integrators 29 are connected to the respective inputs of a subtractor 46.

At the input of the discriminators, one of the channels contains an adder 44 while the other contains a subtractor 45. It can be shown that as a function of the sine of the relative elevational angle $\beta$ of the target, the output signals $x$ and $y$ from the discriminators 42 and 43 are two sine waves in phase-quadrature. These signals are subsequently sampled in the elements 47 and 48 controlled by the signal $b$ produced by the unit 11. At the output of the unit 12, therefore, with each occasion of crossing of the plane (K,M) across the target, values $x_h$ and $y_h$ are obtained.

If the symbols $\Delta x_h$ and $\Delta y_h$ are used for the values $x_h - x_{h-1}$ and $y_h - y_{h-1}$, $h-1$ and $h$ being indices relating to two successive target crossing, then it can be shown that the relative elevational deviation $\Delta \beta_h$ is proportional to the values $\Delta y_h / x_h = - (\Delta x_h / y_h)$. In order to evaluate this deviation $\Delta \beta_h$, advantageously the term which gives the highest precision will be chosen, namely $\Delta y_h / x_h$ if the absolute value of $x_h$ is higher than that of $y_h$, and $- (\Delta x_h / y_h)$ in the contrary case. In order to calculate the elevational displacement $\Delta S$, it is necessary to transform this relative elevational deviation $\Delta \beta_h$ into an absolute elevational deviation $\Delta \beta_h - \Delta \alpha_h$, calling $\alpha_h$ the sampled value of the trim angle given by the accelerometer 16, and to multiply this absolute deviation by the proportional navigation coefficient $k$.

Figure 12:
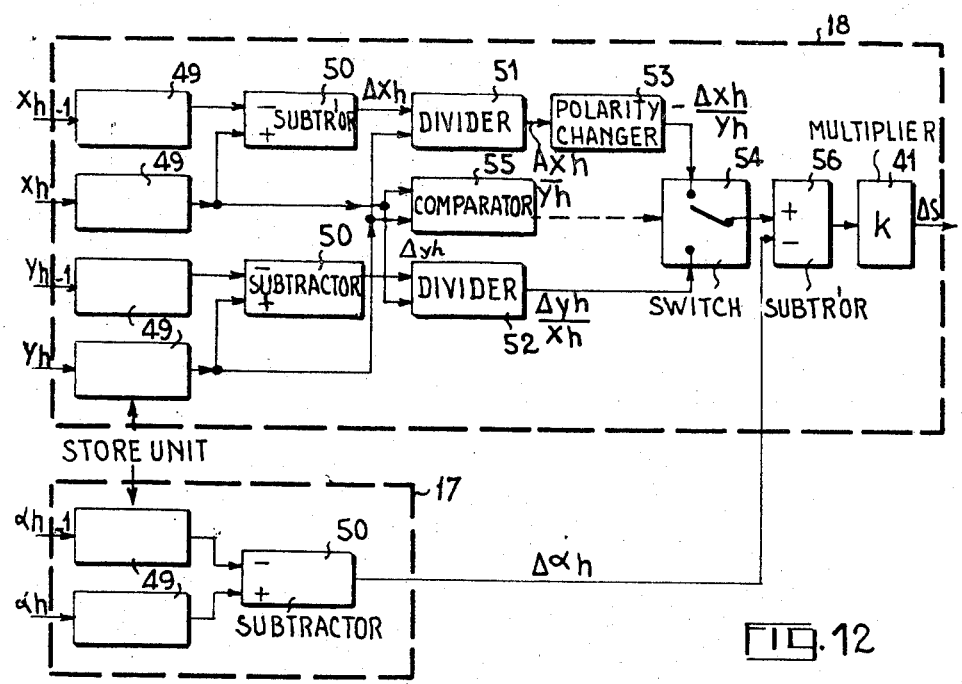

FIG. 12 illustrates a block circuit diagram of such a circuit, 18, for calculating the elevational displacement $\Delta S$. The successive sampled values $x_{h-1}, x_h$ and $y_{h-1}, y_h$, are fed into stores 49 before being subtracted from one another in the subtractors 50. Subtractors 50 supply to dividers 51 and 52 respectively, the values $\Delta x_h$ and $\Delta y_h$. These elements 51 and 52 are also supplied by the stores 49 with the respective values $y_h$ and $x_h$ and produce at their outputs the values $\Delta x_h/y_h$ and $\Delta y_h/x_h$. A polarity changer 53 links the output of the divider 51 to one input of a switch 54. The other input of switch 54 is taken from the output of the divider 52. The control signal for the switch 54 is produced by a circuit 55 which compares the absolute value $x_h$ and $y_h$. The output of switch 54 is connected to one of the inputs of a subtractor 56 supplied at its other input with the value $\Delta \alpha_h$ produced by the trim deviation circuit 17. In the latter, the successive sampled values $\alpha_{h-1}$ and $\alpha_h$ of the trim angle of the missile after their storage in elements 49 are applied to the inputs of a subtractor 50 which furnishes the value $\Delta \alpha_h$. The desired value $\Delta S$ is obtained at the output of a multiplier 41 (multiplication by $k$) which receives the value or signal produced by the subtractor 56.

The values $\Delta G$, $\Delta S$ and $d$ thus determined are subsequently processed through two similar control generator circuits 19 and 20 whose function is to effect the control of the vanes 2. The control is preferably arranged to be of the all-or-nothing type, so that the vanes have three possible positions corresponding to the three positions N, O, P of the relay 21.

The position O is a rest position in which the inclination of the vanes is permanently equal to a value which produces the desired speed of rotation, that is to say, in the order of 10° for a speed of rotation of two revolutions per second. In the positions N and P, the vanes are likewise inclined to either side of the rest position O by a predetermined value. The time for which the vanes are maintained in one or other of these positions determines the amplitude of the trajectory correction which is effected.

This operation of the vanes will, for example, be carried out four times per revolution; twice in the elevational sense, that is to say, when the acoustic axis M crosses the target and when it is at 180° to that position; and twice in the azimuth sense when the acousting axis M is perpendicular to the two aforedefined positions. If the speed of rotation of the missile is equal to two revolutions per second, the maximum duration of each control operation will therefore be ⅛ /sec. As far as the choice of the positions N, O, P of the vanes is concerned, it depends upon the sign of the azimuth or elevational displacement as well as on the position of the value $d$ furnished by the integrator 14 in relation to the ranges of action of the control functions. The table set out hereinafter illustrates by way of example the nature of the control function c applied to the relay 21 as a function of these two parameters.

| Azimuth reference $d$ | Sign $\Delta G$ | Sign $\Delta S$ | Relay Position 21 |
|---|---|---|---|
| 0°− ($\Delta$ S/2) to 0° ($\Delta$ S/2) | | + | N |
| | | − | P |
| 0° + ($\Delta$ S/2) to 90°−($\Delta$ G/2) | | | O |
| 90° − ($\Delta$ G/2) to 90°+($\Delta$ G/2) | + | | P |
| | − | | N |
| 90°+($\Delta$ G/2) to 180° − ($\Delta$ S/2) | | | O |
| 180°−($\Delta$ S/2) to 180° + ($\Delta$ S/2) | | + | P |
| | | − | N |
| 180°+($\Delta$ S/2) to 270° − ($\Delta$ G/2) | | | O |
| 270°−($\Delta$ G/2) to 270° + ($\Delta$ G/2) | + | | N |
| | − | | P |
| 270°+($\Delta$ G/2) to 360° − ($\Delta$ S/2) | | | O |

Figure 13:
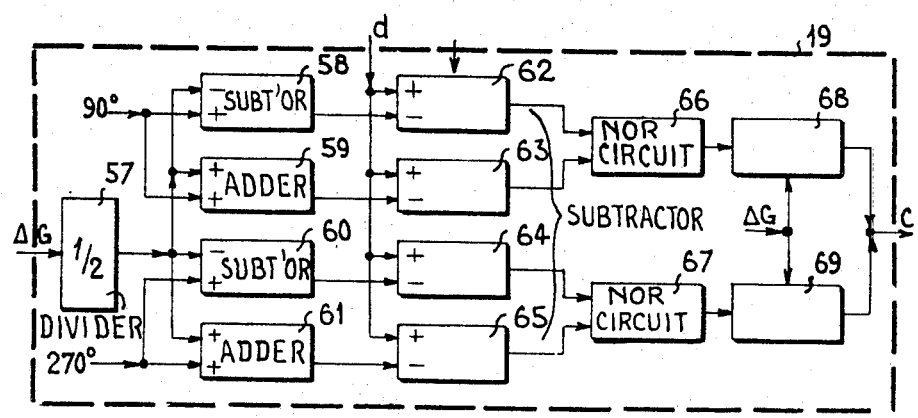

FIG. 13 illustrates a circuit 19 for generating the azimuth commands $c$. In this latter circuit, the value $\Delta G$ is applied to a divider (division by 2) whose output is connected simultaneously to two subtractors 58 and 60 and two adders 59 and 61. The subtractor 58 and the adder 59 are also supplied with the signal or value 90° while the elements 60 and 61 receive the signal or value 270°. Four subtractors 62, 63, 64, 65 are respectively supplied on the one hand with the outputs from the elements 58, 59, 60 and 61, and on the other with the signal $d$ produced by the integrator 14. The outputs of the subtractors 62 and 63 are applied to an exclusive OR-gate 66. A second identical gate 67 receives the outputs from the elements 64 and 65. The gate 66 is connected to a circuit 68 which produces at its output $c$ a signal having a voltage of polarity identical to the sign of $\Delta G$. The element 67 is connected to a circuit 69 which produces at the output a signal $c$ having a voltage of opposite polarity to the sign of $\Delta G$. Depending upon the polarity of this voltage, the relay 21 will be set to N or P. The absence of a voltage corresponds to the position O. Identical commands are generated by the circuit 20 which is similar to the circuit 19 described hereinbefore except that the signals or values $\Delta G$, 90° and 270° are replaced respectively by $\Delta S$, 0° and 180°.

In the self-guidance device described above, the gyrometer 13 partakes the rotation of the missile about its own axis. It must therefore be capable of achieving high accuracy, for example, in the order of 0.5°/sec., about a means working point corresponding to a high angular velocity, for example in the order of 1,000°/sec., something which cannot be achieved except in certain kinds of high-precision gyrometers.

It is valuable to provide an embodiment of the self-guidance device in accordance with this invention in which the unit used to compute the azimuth displacement $\Delta G$ of the target position employs a conventional gyrometer whose means working point corresponds to zero angular velocity.

Figure 14:
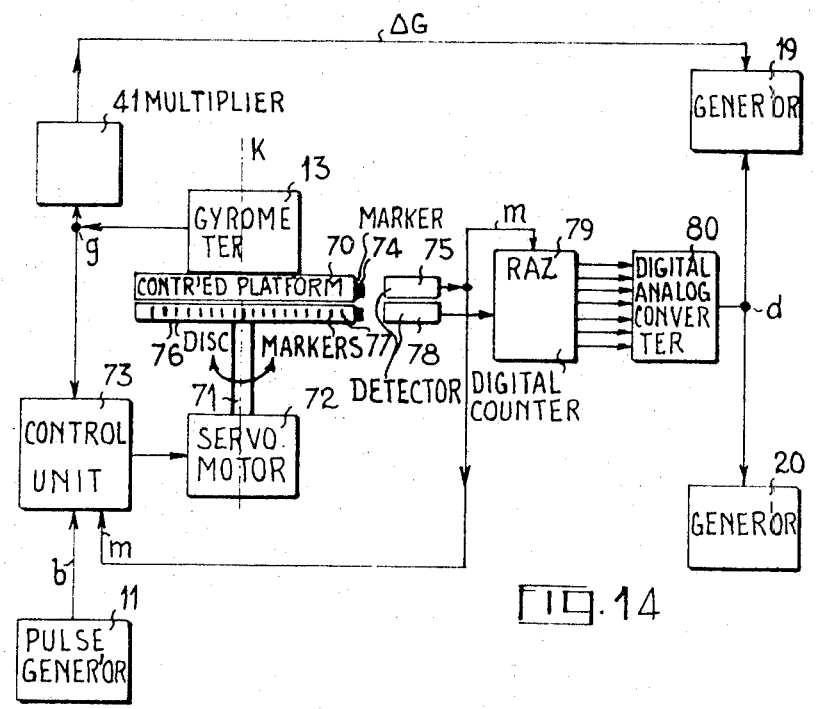
FIG. 14 is a simplified block diagram of another embodiment of an azimuth target position displacement computer unit.

In accordance with an alternative embodiment of the present invention the elements 13, 14 and 15 of the self-guidance device illustrated in FIG. 5 are replaced by the arrangement whose block circuit diagram is shown in FIG. 14.

In this arrangement, the gyrometer 13 is dissociated from the rotational movement of the missile about its own axis, by virtue of the fact that it is fixed to a controlled platform 70 which has only one degree of freedom, about its axis 71, said axis coinciding with the axis of rotation K of the missile.

As long as the target remains undetected by the acoustic system of the self-guidance device, that is to say, as long as no pulse $b$ is produced by the unit 11 of said device, the platform 70 is controlled so that the angular velocity $g$ detected by the gyrometer 13 is zero. By contrast, as soon as a pulse $b$ appears at the output of the generator unit 11, the platform 70 is controlled to maintain it aligned on the detected target, its reference plane then of course containing the target direction. This reference plane is defined by a marker 74 integral with the platform 70. The marker may be, for example, an optical or magnetic marker which results in the appearance at the output of said detector of an electrical pulse $m$ each time it coincides with a detector 75 rotating with the missile about the latter's own axis. The control of the platform 70 is designed to synchronize pulse $m$ with the pulse $b$ produced by the unit 11 of the self-guidance device. To this end, the pulses $b$ and $m$, as also the signal $g$ relating to the angular velocity detected by the gyrometer 13, are applied to the corresponding inputs of an electronic control unit 73 which supplies a servo motor 72 operating the platform 70 through the medium of its spindle 71.

Figure 15:
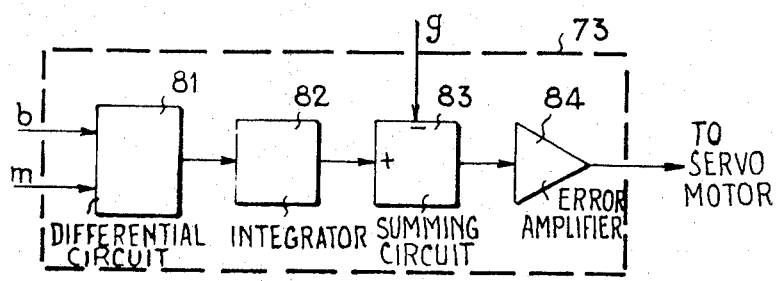
FIG. 15 is a block diagram of an electronic control unit of the control system used in the assembly according to FIG. 14.

An example of the control unit 73 is shown in FIG. 15.

In this arrangement, a differential circuit 81 of conventional type receives the pulses $b$ and $m$ and produces an electrical signal proportional to the time interval separating the respective instants of appearance of said pulses $b$ and $m$. After passage to an integrating circuit 82, the signal is applied to a summing circuit 83 in which there is subtracted from it the value of the signal $g$ furnished by the gyrometer 13. The output of 83 is fed to an error amplifier 84, the output of which connects the output of circuit 83 to the servo motor 72.

When said control is operative, the angular velocity $g$ detected by the gyrometer corresponds to the angular velocity of the target position displacement. The value $\Delta G$ is then obtained by applying the signal $g$ to the input of the multiplier 41 which multiplies by the proportional navigation coefficient $k$.

In the absence of the detected target, that is to say, in the absence of any pulse $b$ at the input of the circuit 81, the corresponding input of the adder 83 is at zero potential which means that the control systems tend also to reduce to zero the value $g$ received by the second input of said adder 83. The platform 70 is then effectively controlled so that the angular velocity $g$ detected by the gyrometer 13 is zero.

In order to generate the value $d$ for application to the units 19 and 20 of the self-guidance system, the value representing the angular position of the acoustic axis M of the missile, as a function of time, in relation to the target direction, there is attached to the platform 70 a disc 76 carrying markers 77 spaced equidistant from one another. The number of said markers 77 depends upon the requisite accuracy of determination of the value $d$. A detector 78 located opposite these markers 77 produces an electrical pulse each time it coincides with a marker. The detector 78 is secured to participate in the rotation of the missile about its own axis. A digital counter 79 is reset to zero by the pulse $m$ furnished by the detector 75 and counts these pulses. The value $d$ is obtained after digital-to-analog conversion in the element 80 of the digital value produced by the counter 79.

In the self-guidance device embodied in accordance with the circuit diagram of FIG. 5, it is necessary to accurately position on the axis K around which the missile rotates, the accelerometer 16 which is used to determine the trim deviation $\Delta\alpha_h$ of the missile, so that the indications it produces are not falsified by the centrifugal acceleration, something which is not always an easy matter to do. by its arrangement of said accelerometer 16 on the platform 70 so that its sensitive axis is located in the reference plane of the platform perpendicularly to its axis of rotation 71.

Thus, a method and apparatus for achieving self-guidance of an anti-submarine missile has been described. In addition, embodiments of the different elements of the self-guidance device, which implement said method, have been described. It goes without saying that its elements could be replaced by other elements fulfilling the same functions without in so doing departing from the scope of the invention.

That which is claimed is:

1. A self-guiding and target-homing launched submarine vehicle of the missile type having a longitudinal axis and assuming after entering in water a substantially vertical trajectory essentially due to its own mass under the influence of gravity comprising
    mobile controllable steering surface means for simultaneously imparting a continuous rotation about said longitudinal axis of the vehicle to modify its trajectory in accordance with cyclically applied control signals;
    a passive submarine listening system means for detecting acoustic signals from the target, said system including panoramic acoustic scanning means;

means for producing said control signals derived from data received by said listening system means, said data representing the angular rotation rate of an imaginary straight line joining the vehicle and the target; and means for applying said control signals to said mobile steering means;

whereby said vehicle is rotated and guided onto the target in accordance with the techniques of proportional navigation.

2. A vehicle as claimed in claim 1, wherein said mobile steering means cyclical control signals modify the vehicle trajectory both in accordance with a first plane defined by the direction of the detected target and the direction of the vehicle, and with another plane perpendicular to the first plane.

3. A self-guiding vehicle as claimed in claim 2, wherein said mobile control surfaces include vanes fitted to the vehicle for effecting permanent rotation of the vehicle around its own axis (K) parallel to the instantaneous direction of its trajectory, said rotation being controlled by said vanes, said vanes being inclined in a predetermined manner vis-a-vis said axis in order to effect omnidirectional azimuth acoustic scanning.

4. A self-guiding vehicle as claimed in claim 3, wherein the command signals are applied to the control position of the vanes of the vehicle in order to correct its trajectory, said command signals being of two types, means for generating said first type of command signals from measurements of the azimuth angles of the target, carried out by the passive listening system of the vehicle, said first type of command signals corresponding to azimuth corrections, and means for generating said second type of command signals from measurements of the elevational angles of the target, effected by said listening system and corresponding to elevational corrections.

5. A self-guiding vehicle as claimed in claim 4, comprising two groups of several hydrophones each located at the surface of the vehicle about its axis of rotation (K), on two circular arcs located in two planes perpendicular to said axis, adjacent hydrophones being spaced by an interval exceeding the wavelength of the acoustic wave to be picked up, said two arcs having different radii.

6. A self-guiding vehicle as claimed in claim 2 comprising two groups of several hydrophones each located at the surface of the vehicle about its axis of rotation (K), on two circular arcs located in two planes perpendicular to said axis, adjacent hydrophones being spaced by an interval exceeding the wavelength of the acoustic wave to be picked up, said two arcs having different radii.

7. A self-guiding vehicle as claimed in claim 1 comprising two similar groups of several hydrophones each located at the surface of the vehicle about its axis of rotation (K), on two circular arcs located in two planes perpendicular to said axis, said two groups being spaced by an interval exceeding the wavelength of the acoustic wave to be picked up, said two arcs having different radii.

8. A self-guiding vehicle as claimed in claim 7, further including weighting and summing circuits for combining the outputs of the hydrophones in each of the two said groups, in order on the one hand from one and the same group to form two acoustic receiving channels (X,Y) azimuthally offset symmetrically in relation to the acoustic axis (M) of the two groups (X, Y), and on the other hand, from the two groups two acoustic receiving channels (Z, $Z_1$) centered on said acoustic axis (M) but producing signals which are out of phase with one another, the four acoustic channels having reception patterns which are narrow in the azimuth or yaw direction and wide in the elevational direction.

9. A self-guiding vehicle as claimed in claim 7, further including weighting and summing circuits for combining the outputs of the hydrophones in each of the two said groups, in order on the one hand from one and the same group to form two acoustic receiving channels (X, Y) azimuthally offset symmetrically in relation to the acoustic axis (M) of the two groups (X, Y), and on the other hand, from the two groups two acoustic receiving channels (Z, $Z_1$) centered on said acoustic axis (M) but producing signals which are out of phase with one another, the four acoustic channels having reception patterns which are narrow in the azimuth or yaw direction and wide in the elevational direction.

10. A self-guiding vehicle as claimed in claim 8 further including an amplitude comparison unit, means for applying the two signals produced by the two acoustic channels (X, Y) which are offset in the yaw direction to said amplitude comparison unit, said unit being operatively arranged to produce a pulse signal (b) characteristic of equality between these two signals, that is to say, of the passage of the plane defined by the axis of rotation (K) of the vehicle and its acoustic axis (M) over the target.

11. A self-guiding vehicle as claimed in claim 10, wherein said comparison unit comprises an auxiliary circuit arranged to continuously form the sum of the two said signals produced by said two channels (X, Y) and inhibit the output of the comparison unit when said sum is below an adaptive threshold which is a function of the value of said sum integrated over a period of rotation of the vehicle so as to suppress possible ambiguities due to secondary lobes in the reception diagrams of said two channels.

12. A self-guiding vehicle as claimed in claim 11, including a transfer unit for calculating the azimuth transfer ($\Delta G$) of said plane defined by said rotational (K) and acoustic (M) axes of the engine, said unit itself comprising a sampler supplied with a signal (d) characteristic of the angle through which the vehicle rotates between two successive passes on the part of said plane (K, M) over the target, a storage element, a subtractor circuit and a multiplier circuit, means for supplying the said signal (d), sampled by said pulse signal (b) which is characteristic of said passes to said storage element, said storage element being connected to the subtractor circuit which forms the difference between a signal characteristic of an angle of 360° and said sampled signal, means for applying the signal thus obtained to the multiplier circuit for multiplying said obtained signal by the proportional navigation coefficient (k) being characteristic of the azimuth transfer ($\Delta G$) whose sign and amplitude define the azimuth correction to be made to the moving vanes of the vehicle.

13. A self-guiding vehicle as claimed in claim 12, further including an integrator and a gyrometer, said signal (d) characteristic of the angle through which the vehicle rotates between two successive passes on the part of said plane (K, M) of the target being furnished by said integrator, means for applying to said integrator an absolute azimuthal reference signal produced by said gyrometer, said gyrometer being adapted to be reset to zero by said pulse signal (b) which is characteristic of the occasions of passage of said plane over the target and means for applying said pulse signal (b) to said gyrometer.

14. A self-guiding vehicle as claimed in claim 13, further including two phase discriminators, means for applying the two signals produced by the two acoustic channels (Z, $Z_1$) centered on the acoustic axis (M) of the vehicle and delivering the out-of-phase signals to said two phase discriminators, one of which is a cosine and the other a sine discriminator, producing as a function of the sine of the relative elevational angle ($\beta$) of the target, two sinusoidal signals (x, y) in phase quadrature, a pair of samplers, means for applying to said samplers the two sinusoidal signals (x, y), said samplers being controlled by said pulse signal (b) which is characteristic of the occasions of passage of said plane (K, M) over the target, an elevational transfer unit, means for applying the two thus sampled signals ($x_h$, $y_h$) to said transfer unit which calculates the elevational transfer ($\Delta S$), said transfer unit comprising a multiplier circuit, a first circuit for generating relative elevational deviation ($\Delta \beta_h$), and a second circuit which subtracts from said relative elevational deviations the sampled variations in the trim angle ($\Delta \alpha_h$) of the vehicle, said second circuit then producing a signal, which, after multiplication in a multiplier circuit (41) by the proportional navigation coefficient (K), is characteristic of said elevational transfer ($\Delta S$), its sign and amplitude defining the elevational correction to be made to the moving vanes of the vehicle and means for applying the signal of said second circuit to said multiplier circuit.

15. A self-guiding vehicle as claimed in claim 14, further including means for controlling the position of said two vanes, the azimuth and elevational correcting command signals for the vehicle being respectively applied to said means to control the two moving vanes, each twice per vehicle revolution, the azimuth correction commands being applied when the plane of symmetry of said vanes coincides with the plane containing the axis of rotation of the vehicle and the straight line joining vehicle and target, the elevational correcting commands being applied when the plane of symmetry of said vanes is perpendicular to said plane containing said axis of rotation and the straight line joining vehicle and target.

16. A self-guiding vehicle as claimed in claim 15, wherein said means to control the two moving vanes comprise a single relay operated in all-or-nothing fashion.

17. A self-guiding vehicle as claimed in claim 11, further including two phase discriminators, means for applying the two signals produced by the two acoustic channels (Z, $Z_1$) centered on the acoustic axis (M) of the vehicle and delivering the out-of-phase signals to said two phase discriminators, one of which is a cosine and the other a sine discriminator, producing as a function of the sine of the relative elevational angle ($\beta$) of the target, two sinusoidal signals (x, y) in phase quadrature, a pair of samplers, means for applying to said samplers the two sinusoidal signals (x, y), said samplers being controlled by said pulse signal (b) which is characteristic of the occasions of passage of said plane (K, M) over the target, an elevational transfer unit, means for applying the two thus sampled signals ($x_h$, $y_h$) to said transfer unit which calculates the elevational transfer ($\Delta S$), said transfer unit comprising a multiplier circuit, a first circuit for generating relative elevational deviation ($\Delta \beta_h$), and a second circuit which subtracts from said relative elevational deviations the sampled variations in the trim angle ($\Delta \alpha_h$) of the vehicle, said second circuit then producing a signal, which, after multiplication in a multiplier circuit (41) by the proportional navigation coefficient (k), is characteristic of said elevational transfer ($\Delta S$), its sign and amplitude defining the elevational correction to be made to the moving vanes of the vehicle and means for applying the signal of said second circuit to said multiplier circuit.

18. A self-guiding vehicle as claimed in claim 12, further including two phase discriminators, means for applying the two signals produced by the two acoustic channels (Z, $Z_1$) centered on the acoustic axis (M) of the vehicle and delivering the out-of-phase signals to said two phase discriminators, one of which is a cosine and the other a sine discriminator, producing as a function of the sine of the relative elevational angle ($\beta$) of the target, two sinusoidal signals (x, y) in phase quadrature, a pair of samplers, means for applying to said samplers the two sinusoidal signals (x, y), said samplers being controlled by said pulse signal (b) which is characteristic of the occasions of passage of said plane (K, M) over the target, an elevational transfer unit, means for applying the two thus sampled signals ($x_h$, $y_h$) to said transfer unit which calculates the elevational transfer ($\Delta S$), said transfer unit comprising a multiplier circuit, a first circuit for generating relative elevational deviation ($\Delta \beta_h$), and a second circuit which subtracts from said relative elevational deviations the sampled variations in the trim angle ($\Delta \alpha_h$) of the vehicle, said second circuit then producing a signal, which, after multiplication in a multiplier circuit (41) by the proportional navigation coefficient (K), is characteristic of said elevational transfer ($\Delta S$), its sign and amplitude defining the elevational correction to be made to the moving vanes of the vehicle and means for applying the signal of said second circuit to said multiplier circuit.

19. A self-guiding vehicle as claimed in claim 11, in which circuit means are provided for generating a signal for controlling the moving vanes, means connected between the comparator unit which compares the amplitude of the signals from the two acoustic channels (X, Y), and the circuit means for controlling the vanes, said means comprising a gyrometer attached to a mounting capable of rotation independently of the missile rotation, an electromechanical positional control system for the gyrometer arranged such that in the absence of the target being located, the gyrometer produces a zero detected angular velocity signal (g) and, as soon as the target being located is found (marked by the apperance of output pulses from the comparison unit) the gyrometer remains aligned in a reference plane containing the direction of the detected target, a dual marking system for marking the position of the reference plane, and circuits for generating the value (d) of the angular position of the acoustic axis (M) of the vehicle as a function of time.

20. A vehicle as claimed in claim 19, wherein the gyrometer mounting comprises a platform equipped at its edge with a marker defining the reference plane and a disc provided at its edge with equidistantly spaced markers in a number which is determined as a function of the requisite accuracy of determination of said value (d) of the angular position of the acoustic axis, said mounting being assembled on a spindle defining its axis of rotation and a servo motor associated with the control system for driving the spindle.

21. A vehicle as claimed in claim 20 wherein the dual marker system comprises, fixed to the vehicle and at the level of said markers a first detector arranged so that on passage of the marker a pulse (m) is produced synchronously with the pulse (b) produced by the comparison unit, and including an electronic control unit and a counter, said pulse being applied to one input of said electronic control unit of the control system and to an input of the counter in said circuits for generating the value (d) of the angular position, and a second detector supplying to a second input of said counter pulses produced by the passage of markers located at the periphery of the disc.

22. A vehicle as claimed in claim 20, wherein the electromechanical position control comprises in the electronic control portion of the control system, connected in series, a differential circuit connected to the output of the comparison unit by one of its inputs, the other input being connected to the output of the first detector of the marking system and furnishing at its output a signal proportional to the time difference between the respective instants of appearance of the pulses applied to said inputs, an integrating circuit, an adder circuit where subtraction of the value of the angular velocity signal (g) is effected, and an amplifier for amplifying the resultant error signal which is applied to the device controlling the servo motor.

23. A vehicle as claimed in claim 20, including a multiplier which multiplies by the proportional navigation coefficient $k$ of the angular velocity signal (g), said multiplier being connected between the output of the gyrometer and one input of the circuit means which produces the control signal for the vanes.

24. A vehicle as claimed in claim 20, including an accelerometer which gives the trim angle ($\Delta\alpha_h$) of the vehicle arranged on said platform so that its axis is located in the reference plane of the platform and perpendicularly to its axis of rotation, the latter coinciding with the axis of rotation (K) of the vehicle.

25. A vehicle as claimed in claim 19 wherein the dual marker system comprises, fixed to the vehicle and at the level of said markers a first detector arranged so that on passage of the marker a pulse (m) is produced synchronously with the pulse (b) produced by the comparison unit, and including an electronic control unit and a counter, said pulse being applied to one input of said electronic control unit of the control system and to an input of the counter in said circuits for generating the value (d) of the angular position, and a second detector supplying to a second input of said counter pulses produced by the passage of markers located at the periphery of the disc.

26. A vehicle as claimed in claim 25, wherein the electromechanical position control comprises in the electronic control portion of the control system, connected in series, a differential circuit connected to the output of the comparison unit by one of its inputs, the other input being connected to the output of the first detector of the marking system and furnishing at its output a signal proportional to the time difference between the respective instants of appearance of the pulses applied to said inputs, an integrating circuit, an adder circuit where subtraction of the value of the angular velocity signal (g) is effected, and an amplifier for amplifying the resultant error signal which is apllied to the device controlling the servo motor.

27. A vehicle as claimed in claim 25, including a multiplier which multiplies by the proportional navigation coefficient $K$ of the angular velocity signal (g), said multiplier being connected between the output of the gyrometer and one input of the circuit means which produces the control signal for the vanes.

28. A vehicle as claimed in claim 25, wherein said circuits for generating the value (d) comprise a counter of the digital type arranged to be reset to zero by the pulse (m) from the first detector and count the pulses from the second detector and comprises also a digital-to-analog converter for producing the value (d) at its output terminal, and means connecting said converter to receive the output of said counter.

29. A vehicle as claimed in claim 19, wherein the electromechanical position control comprises in the electronic control portion of the control system, connected in series, a differential circuit connected to the output of the comparison unit by one of its inputs, the other input being connected to the output of the first detector of the marking system and furnishing at its output a signal proportional to the time difference between the respective instants of appearance of the pulses applied to said inputs, an integrating circuit, an adder circuit where subtraction of the value of the angular velocity signal (g) is effected, and an amplifier for amplifying the resultant error signal which is applied to the device controlling the servo motor.

30. A vehicle as claimed in claim 29, including a multiplier which multiplies by the proportional navigation coefficient $k$ of the angular velocity signal (g), said multiplier being connected between the output of the gyrometer and one input of the circuit means which produces the control signal for the vanes.

31. A vehicle as claimed in claim 19, including a multiplier which multiplies by the proportional navigation coefficient $k$ of the angular velocity signal (g), said multiplier being connected between the output of the gyrometer and one input of the circuit means which produces the control signal for the vanes.

* * * * *